L. A. HUBERT.
GANG PLOW.
APPLICATION FILED SEPT. 4, 1909.
1,044,657.
Patented Nov. 19, 1912.
2 SHEETS—SHEET 1.
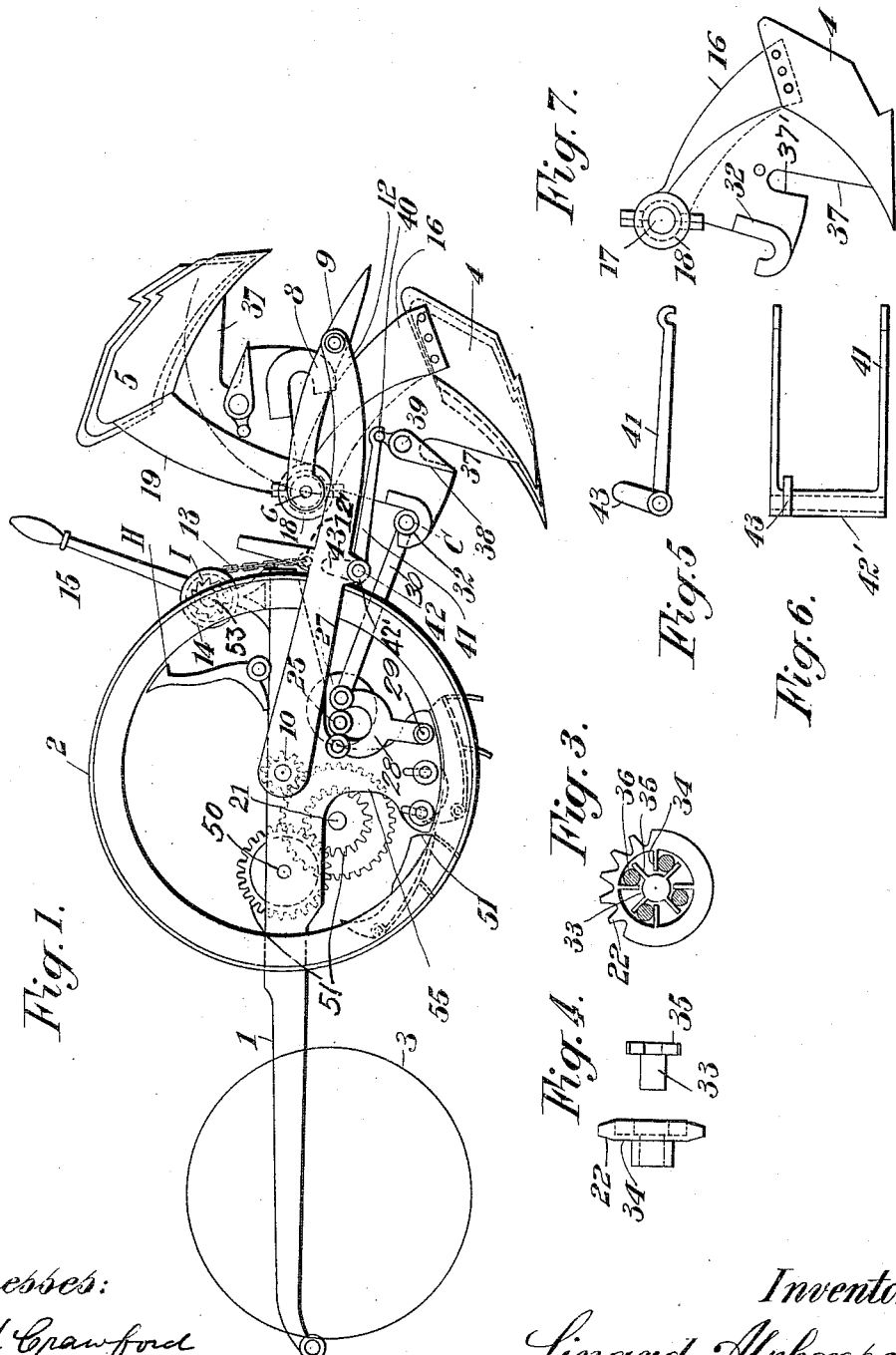
Witnesses:
C. H. Crawford
J. Stern
Inventor:
Linard Alphonse Hubert. by B. Singer
Attorney.

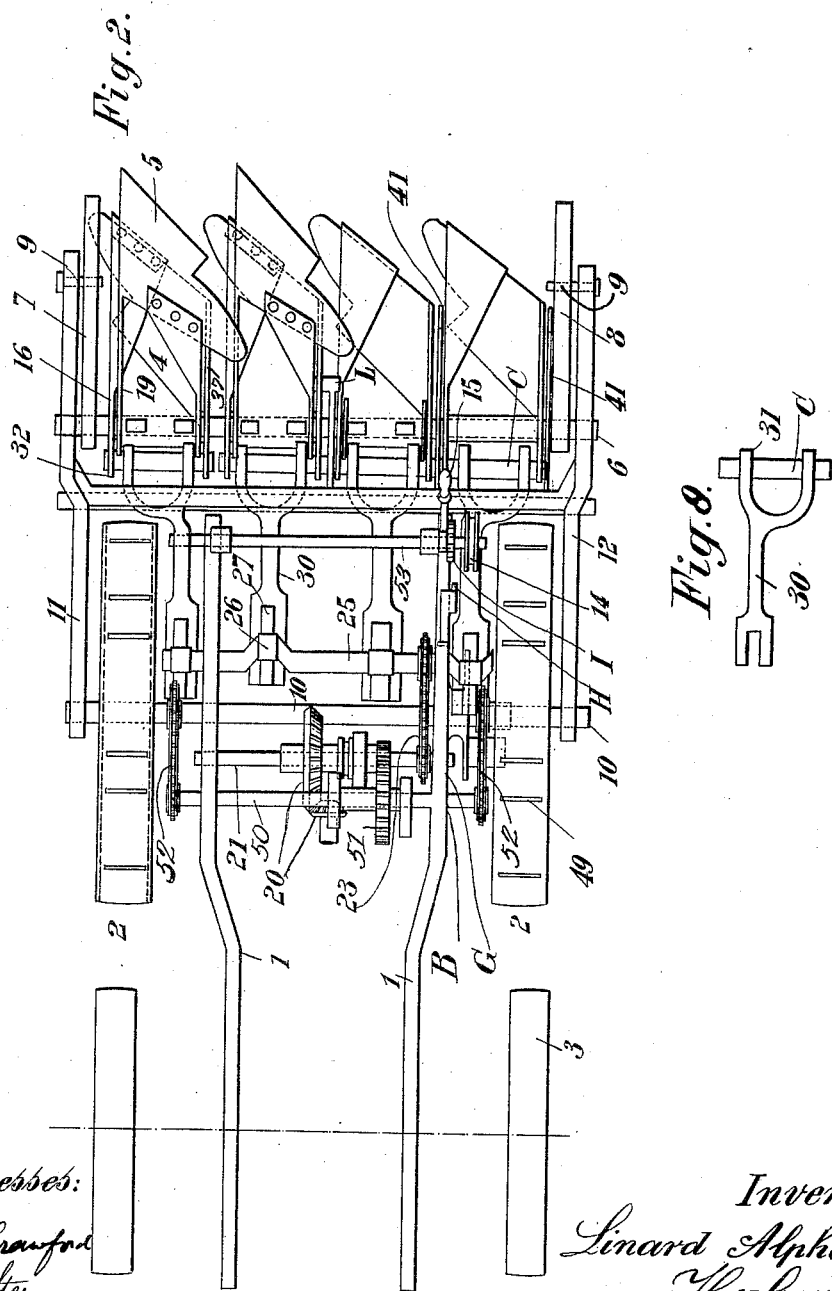

UNITED STATES PATENT OFFICE.

LINARD ALPHONSE HUBERT, OF TROYES, FRANCE.

GANG-PLOW.

1,044,657.   Specification of Letters Patent.   Patented Nov. 19, 1912.

Application filed September 4, 1909. Serial No. 516,289.

*To all whom it may concern:*

Be it known that I, LINARD ALPHONSE HUBERT, a citizen of the French Republic, and resident of Troyes, France, have invented certain new and useful Improvements in Gang-Plows, of which the following is a specification.

This invention relates to improvements in gang plows of the character set forth in my U. S. patent granted November 2, 1909, No. 939,132.

One of the principal objects of this invention is to provide means for successively imparting impulses to the plowshares of the gang so as to reduce the power necessary for operation, with respect to the power required by the device of my former patent.

The invention will be more fully described in connection with the accompanying drawings and will be more particularly pointed out and ascertained in and by the appended claims.

In the drawings—Figure 1 is a view in side elevation of a gang plow embodying one form of my invention. Fig. 2 is a plan view thereof. Fig. 3 is a detail view of a portion of a shock absorbing device. Fig. 4 shows such parts of said device disassembled. Fig. 5 is a side elevation of an operating lever. Fig. 6 is a plan view thereof. Fig. 7 is a detached view of one of the plowshares. Fig. 8 is a plan view of an impulse lever.

Like characters of reference designate similar parts throughout the different figures of the drawings.

As shown, my improved gang plow includes a frame structure 1, an axle 10, drive wheels 2 mounted on the axle and front or steering wheels 3. The source of power, not shown, is applied to gears 20 to drive shaft 21 and shaft 50. Shaft 50 is driven from shaft 21 by gears 51, which need not be described in detail as they form no part of this invention, and their arrangement is described in my aforesaid patent. Chain drive 52 transmits rotary motion to axle 10 from shaft 50 and a cranked impulse shaft 25 is driven by a chain drive 23 from shaft 21. The impulse shaft 25 is provided with a plurality of cranks 26 which are preferably disposed at 90 degrees, one in advance of the other, to successively impart impulses to the several shares of the gang.

Gang frame members 11 and 12 are pivoted on the axle 10 and extend rearwardly of the wheels 2. On pivots 9, secured to the members 11 and 12, are mounted gang reversing or rocking members 7 and 8. The reversing members 7 and 8 carry a rod 6, at their forward ends, and on this rod 6 the several shares of the gang are mounted. As shown, there are four right hand shares 4, shown in an operating position, and four left hand shares 5, shown in an inoperative position. The shares 4 are connected by members 16 and 37 with sleeves 17 which are mounted upon the rod 6.

The shares 5 are connected by members 19 with sleeves 18 which surround the sleeves 17. The shares 4 are provided with impulse hooks 32. The connecting members 37 are provided, as shown in Fig. 7, each with a blade edge 37' with which a blade 38, pivoted at 39, coöperates to form a shear for cutting stubble. The blade 38, above the pivot 39, is provided with a lug 40, engaged by extension 41 whereby it is held from movement about its pivot, the shearing action being effected by the impulse movements imparted to the shares 4.

The frame 1 is provided with an extension 55 on which a rocking lever 28 is pivoted at 29. The rocking lever 28 is provided with a bifurcated end carrying rollers 27, which engage on opposite sides of the cranks 26. A connection 30, with roller C, is provided between the lever 28 and the hook 32 so that when the cranks rock the levers 28 a corresponding impulse will be imparted to the plowshares.

Means are provided for raising the plowshares wholly out of contact with the ground and for limiting the extent of penetration thereof into the ground. As shown, said means include a rock shaft 53 on which a drum 14 is mounted. A chain 13 is fastened to the drum 14 and also to an inwardly projecting extension of the arm 12, which is designated at 12'. A ratchet wheel I is mounted on said shaft 53 and may be locked against rotation in one direction, or to the right, by a pawl H. A lever 15 serves for operating said shaft 53 when grasped by the operator.

In order to cushion shocks resulting from impulse movements imparted to the shares, should the same engage an obstruction, the following means are provided and are shown separately from the main figures for the sake of clearness.

Referring to Figs. 3 and 4, one of the gear members is shown and is indicated at 22, and the same may be one of the sprocket wheels over which the chain 23 is operated. The sprocket 22 is provided with a hollowed out portion having radially inwardly extending blades 34. The sleeve of the sprocket 22 is mounted upon a sleeve 33 having radially outwardly extending blade portions 35. Between these blade portions are interposed a plurality of yielding members 36. It will be readily seen that while these yielding members will transmit motion from the blades 35 to the blades 34 they will also yield to prevent undue shocks should the shares strike an obstruction.

I claim:

1. A gang plow comprising in combination, driving wheels and an axle therefor, a driving shaft, means for driving the said shaft, a main framework mounted on said axle, a plow frame pivotally mounted on said axle, a plurality of rows of plows mounted on said plow frame, the plows of each set being arranged in transverse alinement with respect to the longitudinal axis of the gang plow, means for throwing either set of plows into or out of an operative position and means for imparting successively shocks to the plows of the operated set, substantially as and for the purpose described.

2. A gang plow comprising in combination driving wheels and an axle therefor, a driving shaft, means for driving the said shaft, a main frame mounted on said axle, a hinged plow frame pivotally mounted on said axle, a plurality of sets of plows mounted on said plow frame, the plows of each set being arranged in transverse alinement with respect to the longitudinal axis of the gang plow, means for throwing either set of plows into or out of an operative position, means for imparting successively shocks to the plows of the operative set and means for cutting the weeds and the like in front of the plows, substantially as and for the purpose set forth.

In testimony whereof I have hereunto set my hand in presence of two witnesses.

LINARD ALPHONSE HUBERT.

Witnesses:
   H. C. COXE,
   BARTLEY F. YOST.

---

Copies of this patent may be obtained for five cents each, by addressing the "Commissioner of Patents, Washington, D. C."